United States Patent [19]
Rosenstein et al.

[11] 3,821,770

[45] June 28, 1974

[54] COMPOSITE PHOTOCOMPOSING TYPE DISC

[75] Inventors: William Rosenstein, South Orange; Fred P. Oliva, Cranford, both of N.J.

[73] Assignee: Addressograph-Multigraph Corporation, Cleveland, Ohio

[22] Filed: Feb. 14, 1973

[21] Appl. No.: 332,477

[52] U.S. Cl. .................................................. 95/85
[51] Int. Cl. .......................................... B41b 17/32
[58] Field of Search .................................. 95/4.5, 85

[56] References Cited

UNITED STATES PATENTS 2,714,841 8/1955 Demer ................................ 95/4.5

*Primary Examiner*—John M. Horan
*Attorney, Agent, or Firm*—Ray S. Pyle

[57] ABSTRACT

A composite font disc for a photocomposer machine wherein there is a disc spider which will hold one or many units for rotation and presentation of a font system to a lens system.

2 Claims, 3 Drawing Figures

PATENTED JUN 28 1974 3,821,770

COMPOSITE PHOTOCOMPOSING TYPE DISC

BACKGROUND OF THE INVENTION

One common type photocomposing machine uses a glass disc with a photographic emulsion. The characters of the disc are exposed photographically and the emulsion developed to provide clear character transparencies in an opaque background.

If a particular printing project requires special combination of characters, an entire disc must be planned and developed at considerable expense. If any change is required, the entire disc must be produced anew.

It is recognized that film strips are used in a drum carrier for machines that use drums, but prior to this invention there has been no known segmented disc fonts.

SUMMARY OF THE INVENTION

The advantage of this invention is that common available photographic film is used, rather than thick glass plate.

The disc is a composite of a carrier and a plurality of sections.

Therefore, a change or correction can be carried out on a small section rather than to produce a completely new disc.

IN THE DRAWING

DESCRIPTION OF THE PREFERRED EMBODIMENT

Figure 1:
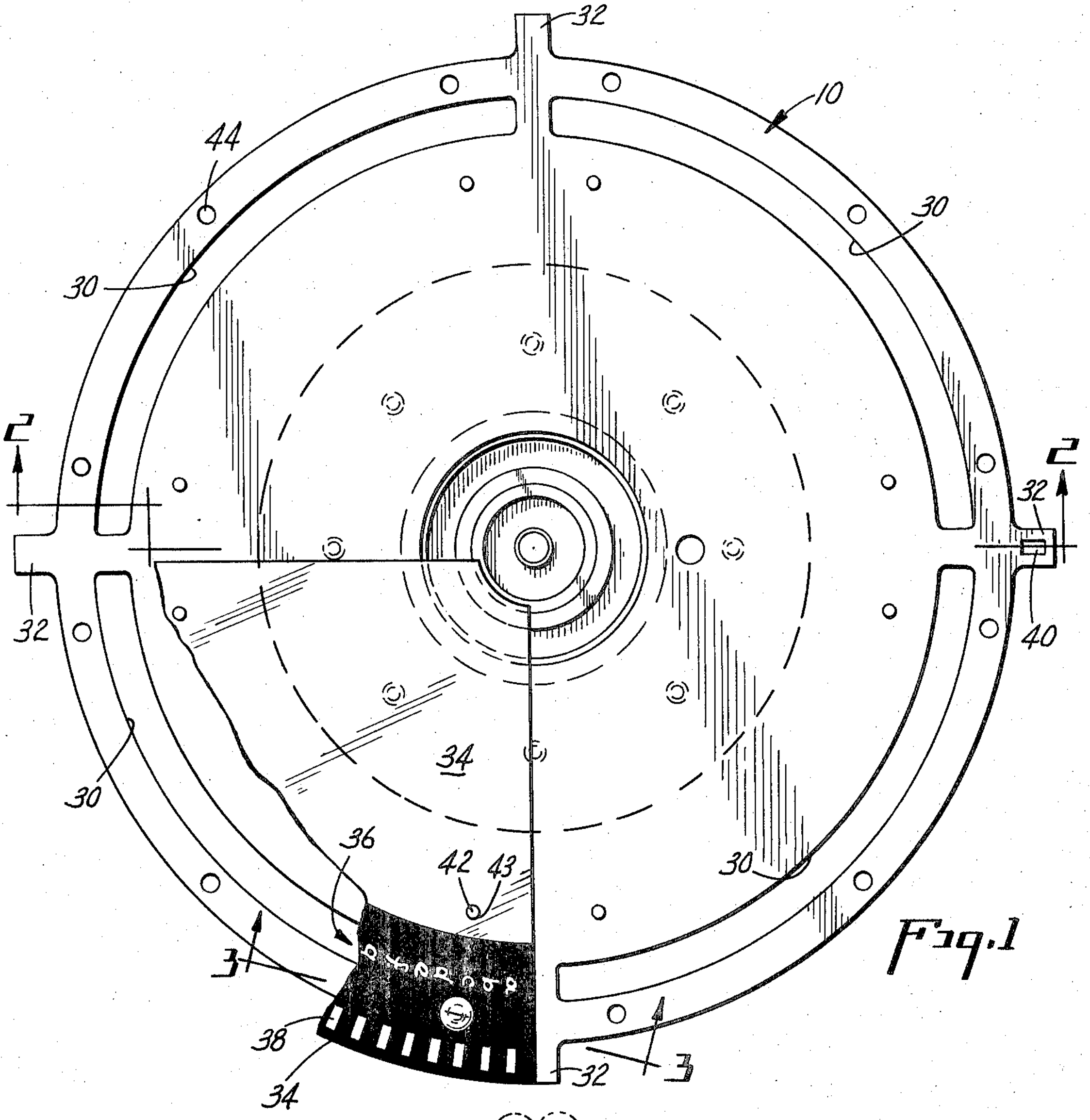
FIG. 1 is a face plan view of a composite font disc embodying principle of this invention.

FIG. 1 is a face plan view of a spider referred to by the reference character 10. The term "spider" is a term of art which generally refers to a form having extended legs of some type. It is a support device.

Figures 2, 3:
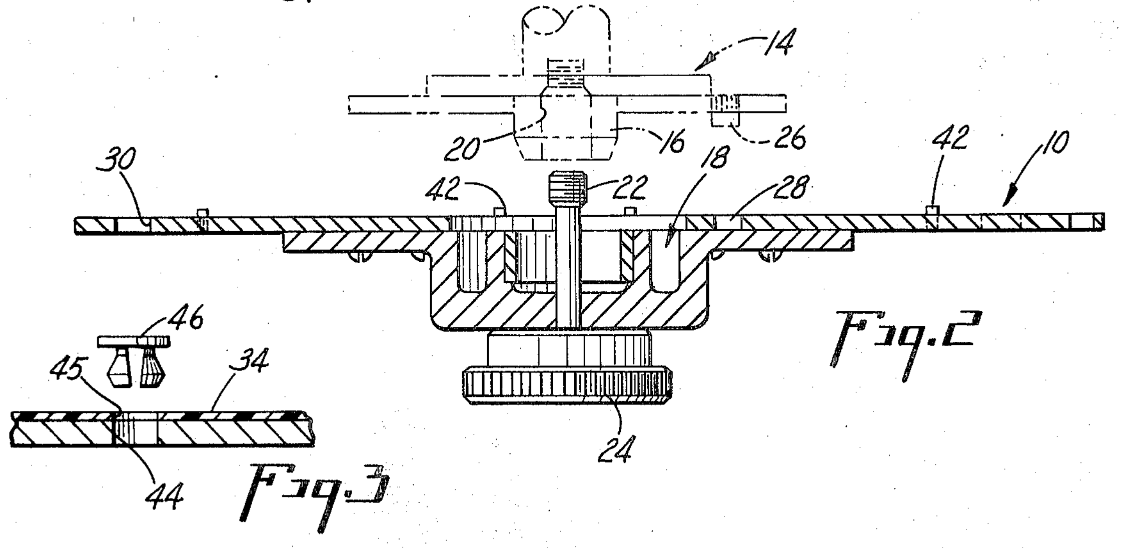
FIG. 2 is a section taken along line 2—2 of FIG. 1, with a cooperating machine spindle element shown in position to receive the disc.
FIG. 3 is a detail of a film segment fastener taken along line 3—3 of FIG. 1.

The spider 10 has a hub 12. In FIG. 2 a section of the spider 10 is shown juxtapositioned with a machine spindle 14. In photocomposition machines using disc on source devices, the machine spindle 14 is a belt driven support to which the disc is attached by conventional devices. This invention is adaptable to such support devices as machine spindle 14 without any substantial alteration.

Machine spindle 14 is equipped with a stub shaft 16 and the spider 10 has a socket 18. Shaft 16 is dimensioned to fit snugly into socket 18 and to provide support for the spider 10.

A central threaded opening 20 axially of the shaft 16 is designed to accept a threaded shaft 22 carried by spider 10. Knob 24 on the shaft 22 enables manual installation and tightening of the spider 10 on the machine spindle 14.

A pin 26 carried by spindle 14 mates with a hole 28 in the spider 10 a distance from the center of the two members in order to provide positive drive beyond that which would be provided by the frictional engagement of the two members due to the pull of the shaft 22.

This invention is operative because of the cooperative design of the font segments bearing register means and the spider support for the font segments.

The spider is divided into quadrants by film supports 32. In the preferred embodiment quadrant segments are employed, although it is feasible to divide the spider into any number of sections. In the illustrated embodiment the quadrant is registered by registration pins extending at the four quadrant locations. Fastening means are provided to hold the font.

According to this invention the circular area is filled by quadrant film sections, such as the quarter sections 34 illustrated in the drawing.

Each quadrant film section 34 has a font system 36 which is dimensioned to lie within a space which is coincident with the size and form of the window slots 30. In the preferred embodiment each font system 36 will be at least one complete font in itself but possibly more. Such a system will require access instructions from the controller of a phototypesetting machine but otherwise will be interchangeable with conventional discs in those machines able to accept conventional full disc systems.

Each quadrant also has a series of timing slots 38, and when the spider 10 is equipped with a full complement of the film segments i.e., four sections as shown in this illustration, a completed set of timing slots will be presented just as in conventional systems.

The phototypesetting machine does not require a precise rotation speed but rather relies upon a recognition of the actual position of the font by counting the timing slots as they pass a photocell position. In order to begin the count, it is customary to provide a larger slot at one position which sets the logic to zero. A time zero window 40 is provided in one of the four quadrant film supports 32 to serve that purpose. Window 40 is aligned with the position assumed by the semi circular path of the timing slot 38.

The several quadrants are positioned accurately upon the spider base by the provision of locating pins 42 cooperating with locating holes 43 in the disc quadrant sections or any other registration means.

Also, holes 44 in the spider base register with holes 45 of the film quadrant and therefore the two may be locked together temporarily for use of the four quadrants on the spider base by means of snap pins 46. Pins 46 and the locking system is seen best in FIG. 3 of the drawing. This embodiment is not the only means for fastening. Other devices such as, but not restricted to, screws, tabs, tapes etc. may be used.

IN SUMMARY

This disclosure describes an arrangement for a segment font, which may have as few as two parts, or as many as desired but with four parts in this preferred embodiment, each part to bear at least a complete alphabet. It is understood four parts is only one of many possible arrangements.

The four part arrangement permits the user to have freedom of choice relative to type styles. The user will be able to get any combination of type styles required without needing to commit the requirement prior to a type font purchase.

The four part arrangement would require a change from the current character sequence and necessitate a software modification. One useable sequence would establish 56 and multiples of 56 as machine constants.

In each of the two concentric rows, the same characters would reappear every 56 disc positions. Thus the letter "A" would appear in the same position on each film segment, irrespective of style.

Since the disc segments are held in supporting spider 10 four character positions in each quadrant are sacrificed to the quadrant supports. Thus position 53, 54, 55, 56; 109, 110, 111, 112; 156, 166, 167, 168 and 221, 222, 223, 224, are not accessible. There will be 108 characters for each style on each of the four segments.

The machine constants of 56, 112, 168 added to the addresses, 1 through 52 will result in a font change. All addresses, 1–26 are lower case letters, 26–52 upper case letters, all resident in the outer row. Any symbol other than letters represent a row shift. 1–18 + row shift is the remainder of lower case, 19–37 + row shift is the remainder of upper case with 38–52 + row shift the super case. This arrangement requires that each font segment be supplied with an associated width tape which needs to be loaded into memory in the same sequence as the carrier bears the segments.

Were the disc divided into two segments, the existing software could be used since the present font layouts would be retained. One font complete, but for four character stations would be resident in each ring. Thus for a software control phototypesetter, the user would need to make a prior choice for two alphabets in a style, e.g., a bold and italic or a Roman and bold. This represents a decrease in flexibility and is therefore less desirable than the four segment scheme.

A possible alternate embodiment might utilize one segment of a four segment disc as a sorts segment. Special characters and symbols could be resident in the segment. When a typesetter requires special characters for a job, he would order this sorts, or Pi segment from the producer. Because we would not need to generate an entire font, the producer could respond in a shorter time frame and at lower cost to the customer.

What is claimed is:

1. A character disc for a photocomposing machine wherein a disc is rotated to present a silhouetted character to a flash illuminated lens system comprising:

a spider support frame having:

A. a central hub for rotatably mounting said frame;

B. at least two semi circular slots having a common axis with said hub axis;

at least two film segments each having a font system of a size and location to register in one of said spider slots, and, means to clamp said segments upon said spider with the fonts registered with said slots.

2. A disc support member; a plurality of film segments arranged juxtapositioned on said disc with a portion thereof in a circular path;

a central hub in the form of a disc for removably securing said segments and disc into a cooperating unit;

each said segment having a field in said circular path wherein a reproducible font source of characters is stored for presentation to a reproduction station;

a mounting means for said segments and disc at the central axis of said circular path, and said hub disc having radial bands extending from the disc to register with the junction of adjacent segments to cover the leading edge of one segment and the trailing edge of the adjacent segment against said disc support and thereby hold the segments into a cooperating unit.

* * * * *